United States Patent [19]

Spigarelli

[11] 4,394,802

[45] Jul. 26, 1983

[54] COUNTER-CONVECTION VAPOR CONTROL SYSTEM

[75] Inventor: Donald J. Spigarelli, Carlisle, Mass.

[73] Assignee: The HTC Corporation, Concord, Mass.

[21] Appl. No.: 257,141

[22] Filed: Apr. 24, 1981

[51] Int. Cl.³ .............................................. F26B 3/04
[52] U.S. Cl. .......................................... 34/27; 34/32; 34/78; 228/242
[58] Field of Search .................. 228/180, 242; 134/12, 134/31; 34/27, 32, 73, 75, 78, 34

[56] References Cited

U.S. PATENT DOCUMENTS

| | | | |
|---|---|---|---|
| 918,621 | 4/1909 | Wenborne | 34/78 |
| 3,375,177 | 3/1968 | Rand | 134/12 |
| 3,904,102 | 9/1975 | Chu et al. | 34/27 |
| 4,077,467 | 3/1978 | Spigarelli | 34/27 |

Primary Examiner—Larry I. Schwartz
Attorney, Agent, or Firm—Weingarten, Schurgin, Gagnebin & Hayes

[57] ABSTRACT

A method and apparatus for vapor conservation and control for use with vapor phase soldering, degreasing, or similar systems having an open tank containing the vapor into which work is introduced and removed. The present invention comprises apparatus associated with the tank and operative to create a counter-convection flow which opposes the outward convection flow of vapor from the open tank. The process vapor is substantially retained within the tank while maintaining an open central channel for work entry and removal. The counter-convection flow is produced by establishment of a temperature differential by cooling and/or heating means disposed to cause a convection flow in a downward direction which opposes the normal upward flow of vapor from the tank.

17 Claims, 2 Drawing Figures

COUNTER-CONVECTION VAPOR CONTROL SYSTEM

FIELD OF THE INVENTION

This invention relates to vapor phase soldering, degreasing, and like systems, and more particularly to a method and apparatus for conservation and emission control of a processing vapor in those systems.

BACKGROUND OF THE INVENTION

Vapor phase systems are known in which a processing vapor is provided in a vessel and into which a product is introduced to accomplish a particular process or operation. One such system is known for vapor phase soldering wherein solder on a workpiece is caused to melt or reflow by the heat from a condensing heated vapor. In such a vapor phase soldering system, a fluorocarbon or other suitable liquid is provided in a tank and is heated to a temperature sufficient to produce a hot saturated vapor above the surface of the liquid and in equilibrium therewith. This liquid preferably is a nonconducting chemically stable inert liquid having an atmospheric boiling point slightly above the soldering temperature and which provides non-oxidizing, non-flammable vapor. The tank is usually open to the atmosphere to facilitate product entry and removal, and the vapor can emanate from the open tank into the atmosphere. The release of process vapor into the atmosphere can present a health risk, and the presence and magnitude of such emissions are becoming the subject of increasingly stringent government and industry health and safety standards. Moreover, the liquid providing the vapor can be relatively expensive, and thus for economy of system operation, loss of the liquid through vapor emission into the atmosphere should also be minimized.

One technique for minimizing vapor loss is shown in U.S. Pat. No. 3,904,102 wherein a secondary vapor blanket is provided over the primary or processing vapor to shield the primary vapor from the atmosphere. The secondary vapor blanket is most typically formed of Freon TF (R-113) which stratifies between the primary vapor and the atmosphere by virtue of a lower boiling point and a lower density than the primary vapor. Such a dual vapor system presents several disadvantages. The system can be more complex than single vapor systems by reason of the additional cooling and recovery equipment required for the secondary fluid. The secondary vapor is not in contact with its own boiling phase but rather is exposed to the higher temperature primary vapor; thus, the secondary vapor is caused to exist at a superheated temperature, usually about 180°–225° F., which causes breakdown of the material into components which can be toxic and corrosive. In the case of Freon TF, gases can form and combine with water to produce hydrochloric and hydrofluoric acids, which can affect the processing system and add to the cost of its maintenance. Such acid contaminants exist in the secondary vapor to some degree even when employing acid removal procedures on the condensed secondary liquid. Moreover, the boiling phase of the primary liquid can generate pollutants such as perfluoroisobutylene (PFIB) which can enter the atmosphere.

Systems have been proposed using tank covers to the processing vapor, however, vapor loss still occurs when the cover is opened to admit product entry and removal. An improved system for minimizing the problems of vapor loss is shown in U.S. Pat. No. 4,077,467 of the same inventor and assignee as herein. In the system therein described, the primary and secondary liquids are separated and contained within closed individually controlled vapor-lock chambers. The separate chambers minimize vapor communication therebetween, inhibit the flow of contaminants, minimize vapor loss, and avoid fluid breakdown due to excessive heating of the secondary liquid. The separation of the chambers is achieved by movable doors which sequentially open to admit the work and close behind the work; after the soldering is completed, the doors operate in reverse sequence.

Another system is shown in U.S. Pat. No. 3,375,177, wherein a convection flow is created by a first set of cooling coils, which flow is generally upward in the center of the vessel and downward along the vessel walls. A second set of cooling coils is positioned about the vessel walls and spaced above the first set of coils and which functions to cause a downward convection flow at the vessel walls coincident with the vapor flow from the first set of cooling coils. The vapor rising upward in the vessel is entrained and drawn around the second coils which function to condense the vapor to cause a convection current to be drawn toward the second coils and downward along the tank walls. However, the upward vapor flow in the central portion of the vessel can still result in substantial vapor loss through the vessel opening.

SUMMARY OF THE INVENTION

The method and apparatus of the present invention is operative to minimize vapor loss by inducing in the process tank a downward counter-convection flow which opposes the upward convection of vapor in the process vessel, while maintaining an open channel for work entry and removal. The counter-convection flow is produced by establishment of a temperature differential by cooling and/or heating means disposed in the tank to cause a convection flow in a direction which opposes the normal flow of vapor from the tank. In preferred embodiment, the invention comprises a structure within the process tank centrally disposed therein and spaced from the tank walls and having one or more inner cooled surfaces and one or more outer heated surfaces. An upward convection flow is caused in the peripheral space between the tank walls and the heated surfaces of the counter-convection structure, and a downward convection flow is created in a central opening of the counter-convection structure such that an overall convection flow is provided in a direction which opposes the normal flow of vapor from the tank. The vessel walls themselves may be heated in the region of the counter-convection means to increase the counter-convection flow. A fan or other like means can also be employed to enhance the flow. Preferably the counter-convection structure is disposed within the process vessel; however, such means need not be within the vessel but can be contained within a separate vessel disposed above and in communication with the process vessel through a mating opening.

DESCRIPTION OF THE DRAWING

The invention will be more fully understood from the following detailed description and the accompanying drawing, wherein.

DETAILED DESCRIPTION OF THE INVENTION

Figure 1:
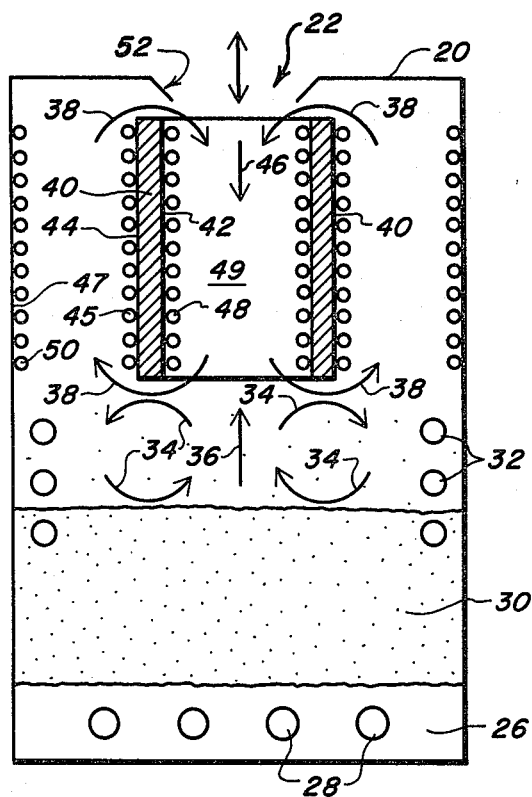
FIG. 1 is a sectional elevation view of a preferred embodiment of the invention.

Referring to the drawing, a vapor processing system is shown comprising a tank or vessel 20 having an opening 22 for product entry and removal, and a fluid 26 heated by submerged heaters 28 to produce a saturated vapor zone 30. Cooling coils 32 are provided about the inner wall of vessel 20 at a height to define the upper level of the vapor zone. The result of the cooling effect of the cooling coils 32 above the heated vapor is to cause convection currents 34 to produce an upwardly directed vapor flow 36 in the central area of the vessel toward the vessel opening 22. Normally this upward flow of vapor results in escape of vapor from the vessel opening, and replacement of the vapor by cooler outside air entering at the periphery of the vessel opening. By the present invention, however, a counter-convection is established to substantially minimize vapor loss from the vessel opening. The counter-convection is provided by a structure 40 centrally disposed within the vessel and spaced from the confronting vessel walls. In the illustrated embodiment, the structure 40 is of annular configuration and has a cooled inner surface 42 provided by cooling coils 48, and a heated outer surface 44 provided by heater coils 45. The heated surface 44 confronts the interior vessel wall 47, while the cooled surface 42 is disposed around a central channel 49 within the tank in alignment with the tank opening 22.

Figure 2:
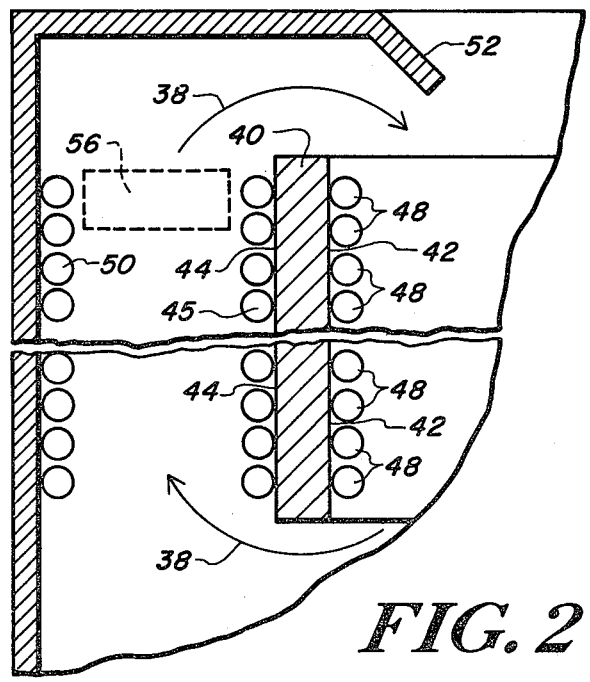
FIG. 2 is an enlarged sectional elevation view, partly cutaway, of the embodiment of FIG. 1.

A temperature differential is established by the relatively heated and cooled surfaces of structure 40 to provide upward convection flow through the annular space between the heated surface 44 and the confronting tank wall, and a downward flow through the central opening of structure 40. The counter-convection flow is illustrated in FIGS. 1 and 2 by arrows 38. As a result, a generally downward flow 46 is produced which opposes the upward convection flow from the heated vapor to thereby minimize the vapor loss through the vessel opening which would otherwise occur without use of the novel counter-convection means. The top wall of the tank includes inwardly disposed baffles 52 which serve to direct the counter-convection flow from the annular space into the central opening 22 to aid in reducing vapor loss from the opening.

Heater coils 50 may be provided along the vessel wall confronting structure 40 to increase the upward convection flow in this annular region. A fan or the like can also be employed to enhance the convection flow. A vapor control unit 56 can be provided in the annular space, as illustrated in FIG. 2, to remove vapor from the air volume flowing through the annular space such that the air flow near the vessel opening 22 is of lower vapor content. As a consequence, less vapor is present at the upper portion of the tank, and less vapor can be lost through the opening 22. Vapor removal may be accomplished by any well-known means such as molecular sieves, dessicants, activated carbon, or materials which support nucleation, such as glass or metal wools.

The counter-convection structure can alternatively be disposed in a separate surrounding vessel which is installed on top of and in fluid communication with the process vessel. It is understood that the invention is not intended to be limited by what has been particularly shown and described, as modifications and alternative implementations will occur to those versed in the art. The structure need not be annular but can be of any configuration to produce the intended counter-convection flow in the process tank. The cooling and/or heating means may also be of forms other than the illustrated coils to produce the counter-convection flow. Accordingly, the invention is not to be limited except as indicated in the accompanying claims.

What is claimed is:

1. For use in a vapor phase processing system having a vessel having top walls containing a vapor in a processing vapor zone and a central opening in the vessel top walls by which a work product is introduced into and removed from the processing vapor zone and through which the vapor in the processing vapor zone tends to upwardly flow by convection, a counter-convection vapor flow system comprising:

a structure disposed in association with the vessel and having one or more first surfaces for forming a vertically oriented central channel in the vessel in communication with said opening and having one or more second surfaces for forming with said top walls a peripheral space in the vessel substantially not in communication with said opening; and means associated with said structure for providing a temperature differential in the vessel to cause a flow of the vapor in the vessel which is upward in the peripheral space and downward in the central channel, said downward flow providing a counter-convection flow which opposes the upward flow of vapor from the processing vapor zone toward the vessel opening.

2. The vapor control system of claim 1 wherein said means includes cooling means at the one or more first surfaces of said structure and heating means at the one or more second surfaces of said structure.

3. The vapor control system of claim 2 wherein said structure is of annular configuration having said cooling means on the inner surface thereof confronting the central channel and said heating means on the outer surface thereof confronting the peripheral space.

4. The vapor control system of claim 3 wherein said structure is disposed within said vessel in spaced relation to the confronting vessel wall, the peripheral space being between the structure and the confronting vessel wall.

5. The vapor control system of claim 1 wherein said vessel includes baffles inwardly disposed about the opening of the vessel and operative to direct the counter-convection flow from the peripheral space into the central channel.

6. The vapor control system of claim 2 further including heating means in the vessel and confronting the peripheral space to increase the upward convection flow therein.

7. The vapor control system of claim 1 including vapor removal means in the peripheral space for removing vapor from the fluid flowing therethrough.

8. For use in a vapor phase processing system having a vessel containing a processing vapor zone and a central top opening by which a work product is introduced into and removed from the processing vapor of the processing vapor zone and through which the processing vapor tends to convectively flow outwardly along a processing vapor flow path, a counter-convection vapor control method comprising the steps of:

cooling a first surface in the vessel adjacent the processing vapor flow path in a vertical central channel thereof in communication with the vessel opening;

heating a second surface in the vessel confronting a peripheral space that substantially is not in communication with said opening around the central channel;

thereby to cause a temperature differential to provide a flow which is upward in the peripheral space and downward in the central channel, said downward flow providing a counter-convection flow which opposes the upward convection flow of vapor from the vapor processing zone toward the vessel opening.

9. A vapor phase processing system comprising:

a vessel containing a processing vapor zone and a central opening in the top walls of the vessel by which a work product is introduced into and removed from the processing vapor and through which the vapor produced by the processing vapor zone tends to flow upwardly by convection;

first means centrally disposed within the vessel above the processing vapor zone and spaced from the confronting vessel side walls and including one or more inner walls defining a central vertical channel in the vessel in communication with the vessel opening, and one or more outer surfaces spaced from the confronting vessel side walls and defining with the vessel top walls a peripheral space substantially not in communication with the opening; and second means associated with said first means for establishing a temperature differential within the vessel above the processing vapor zone to cause a flow which is upward in the peripheral space and downward in the central channel, said downward flow providing a counter-convection flow which opposes the upward convection flow of the vapor from the vapor zone through the vapor channel and toward the vessel opening.

10. The system of claim 9 wherein said first means is a structure of annular configuration having an inner annular surface confronting the central channel and an outer annular surface confronting the peripheral space.

11. The system of claim 10 wherein said second means includes cooling means on the inner surface of the annular structure and heating means on the outer surface of the annular structure.

12. The system of claim 11 wherein the central channel is substantially aligned with the vessel opening.

13. In a vapor phase processing system of the type wherein an open top tank has therein a preselected process fluid in both liquid phase and vapor phase, and wherein said fluid in vapor phase tends to flow out of the open top of the tank by convection through a central spatial region of said tank in a first upward direction; vapor phase control apparatus for preventing the exit of said fluid in said vapor phase through the open top, comprising:

first means for producing a flow of said fluid in said vapor phase in a second direction generally parallel to said first direction and through a peripheral spatial region between the walls of said tank and said central spatial region; and second means cooperative with said first means for diverting the flow of said fluid in said vapor phase in said second direction to a flow in a third direction generally opposite said first direction and through said central spatial region of said tank;

whereby a downward counter-flow of said fluid in said vapor phase is produced which opposes the upward flow of said fluid in said vapor phase to prevent the exit of said fluid in said vapor phase from the open top of the tank.

14. The vapor phase control apparatus as recited in claim 13, wherein said second means includes inwardly directed baffles connected to said tank for directing said flow in said second direction into said flow in said third direction.

15. The vapor phase control apparatus as recited in claim 13, wherein said first means includes heating coils.

16. The vapor phase control apparatus as recited in claim 13, wherein said second means includes cooling coils.

17. The vapor phase control apparatus as recited in claim 13, further including third means in the peripheral spatial region for removing a portion of the fluid in said vapor phase.

* * * * *